(12) United States Patent
Salois et al.

(10) Patent No.: US 11,479,362 B1
(45) Date of Patent: Oct. 25, 2022

(54) VARIABLE VOLUME HIGH ENERGY CATAPULT ASSEMBLIES FOR EJECTION SYSTEMS

(71) Applicant: GOODRICH CORPORATION, Charlotte, NC (US)

(72) Inventors: Matthew D. Salois, Fairfield, CA (US); Jeff Benjamin, Colorado Springs, CO (US); Kevin Mueller, Davis, CA (US)

(73) Assignee: Goodrich Corporation, Charlotte, NC (US)

( * ) Notice: Subject to any disclaimer, the term of this patent is extended or adjusted under 35 U.S.C. 154(b) by 14 days.

(21) Appl. No.: 17/231,797

(22) Filed: Apr. 15, 2021

(51) Int. Cl.
*B64D 25/10* (2006.01)

(52) U.S. Cl.
CPC .................................. *B64D 25/10* (2013.01)

(58) Field of Classification Search
CPC ...................................................... B64D 25/10
See application file for complete search history.

(56) References Cited

U.S. PATENT DOCUMENTS

| 2,968,291 | A | * | 1/1961 | Weinstock | .............. | F02B 45/06 |
| | | | | | | 123/24 A |
| 3,027,125 | A | * | 3/1962 | Fulton | .................... | B64D 25/10 |
| | | | | | | 244/122 AD |
| 4,396,171 | A | * | 8/1983 | Schultz | .................. | B64D 25/10 |
| | | | | | | 60/233 |
| 4,673,147 | A | * | 6/1987 | Solomonides | ......... | B64D 25/10 |
| | | | | | | 244/122 A |

\* cited by examiner

*Primary Examiner* — Richard G Davis
(74) *Attorney, Agent, or Firm* — Snell & Wilmer L.L.P.

(57) ABSTRACT

A high energy catapult assembly may comprise an outer tube and an inner tube located within the outer tube. The outer tube may be configured to telescope relative to the inner tube. A propellant cartridge may be located in an inner tube chamber of the inner tube. An actuator may be configured to change an open volume of the inner tube chamber.

20 Claims, 7 Drawing Sheets

VARIABLE VOLUME HIGH ENERGY CATAPULT ASSEMBLIES FOR EJECTION SYSTEMS

FIELD

The present disclosure relates generally to high energy catapult assemblies, and more particularly, to high energy catapult assemblies for ejection systems.

BACKGROUND

Current ejection seats utilize a high energy catapult assembly (sometimes referred to as a rocket-catapult assembly) to expel the ejection seat from an aircraft. The high energy catapult assembly is an energetic device that includes a catapult stage and a rocket stage. The catapult stage fires first, ejecting the ejection seat and any occupant of the ejection seat from the aircraft cockpit. The rocket stage then ignites and propels the ejection seat and its occupant to a height associated with safe parachute recovery. Current high energy catapult assemblies use a gas generator that generates pressure in the catapult and forces the ejection seat and its occupant from the aircraft. The body mass of ejection seat occupants can vary greatly. The force required to eject a heavier occupant can injure a lighter occupant. However, if the amount of force generated by the catapult is reduced, the proper aircraft separation velocity may not be achieved for a heavier occupant. In this regard, the catapult needs to generate enough force to propel a lighter occupant without causing injury, but also enough energy for a heavier occupant to achieve proper aircraft separation velocity.

SUMMARY

A high energy catapult assembly is disclosed herein. In accordance with various embodiments, the high energy catapult assembly may comprise an outer tube and an inner tube located within the outer tube. The outer tube may be configured to telescope relative to the inner tube. A propellant cartridge may be located in an inner tube chamber of the inner tube. An actuator may be configured to change an open volume of the inner tube chamber.

In various embodiments, the open volume may be defined, at least partially, by an upper sealing interface of the inner tube chamber, a lower sealing interface of the inner tube chamber, and an interior surface of the inner tube. The actuator may be configured to change a distance between the upper sealing interface and the lower sealing interface.

In various embodiments, a piston of the actuator may be coupled to the propellant cartridge. Actuation of the piston may translate the propellant cartridge within the inner tube chamber. In various embodiments, a seal may be configured to translate with the piston. The seal may form the lower sealing interface of the inner tube chamber. In various embodiments, the seal may be located between the propellant cartridge and the interior surface of the inner tube.

In various embodiments, a controller may be configured to send actuation commands to the actuator. An occupant weight input may be operably coupled to the controller. In various embodiments, the occupant weight input may comprise a weight sensor.

In various embodiments, the controller may be configured to command the actuator to set the distance between the upper sealing interface and the lower sealing interface to a first distance in response to determining a weight signal received from the occupant weight input is less than or equal to a threshold weight. The controller may be configured to command the actuator to set the distance between the upper sealing interface and the lower sealing interface to a second distance in response to determining the weight signal received from the occupant weight input greater than the threshold weight, the second distance being less than the first distance.

An ejection seat is also disclosed herein. In accordance with various embodiments, the ejection seat may comprise a seat back and a high energy catapult assembly configured to expel the ejection seat from an aircraft. The high energy catapult assembly may comprise an outer tube coupled to the seat back, an inner tube located within the outer tube, a propellant cartridge located in an inner tube chamber of the inner tube, and an actuator configured to change an open volume of the inner tube chamber. The outer tube may be configured to telescope relative to the inner tube.

In various embodiments, the open volume may be defined, at least partially, by an upper sealing interface of the inner tube chamber, a lower sealing interface of the inner tube chamber, and an interior surface of the inner tube. The actuator may be configured to change a distance between the upper sealing interface and the lower sealing interface.

In various embodiments, a base structure may be coupled to the inner tube. The base structure may be configured to be stationary during expulsion of the ejection seat. In various embodiments, a piston of the actuator may be coupled to the propellant cartridge. Actuation of the piston may translate the propellant cartridge within the inner tube chamber.

In various embodiments, the high energy catapult assembly may further comprise a seal configured to translate with the piston. The seal may form the lower sealing interface.

In various embodiments, a controller may be configured to send actuation commands to the actuator. An occupant weight input may be operably coupled to the controller. In various embodiments, the controller may be configured to command the actuator to set the distance between the upper sealing interface and the lower sealing interface to a first distance in response to determining a weight signal received from the occupant weight input is less than or equal to a threshold weight. The controller may be configured to command the actuator to set the distance between the upper sealing interface and the lower sealing interface to a second distance in response to determining the weight signal received from the occupant weight input greater than the threshold weight, the second distance being less than the first distance. In various embodiments, the ejection seat may further comprise a seat bucket. The occupant weight input may comprise a weight sensor located in the seat bucket.

Also disclosed herein is an article of manufacture including a tangible, non-transitory computer-readable storage medium. The storage medium may have instructions stored thereon for determining an open volume of a variably volume inner tube of a high energy catapult assembly. The instructions, in response to execution by a controller, may cause the controller to perform operations. In accordance with various embodiments, the operations may comprise receiving, by the controller, a weight signal; determining, by the controller, a desired distance between an upper sealing interface of an inner tube chamber of the variable volume inner tube and a lower sealing interface of the inner tube chamber of the variable volume inner tube based on the weight signal; and sending, by the controller, an actuation command corresponding the desired distance to an actuator. The actuator may be configured to change a distance between the upper sealing interface of the inner tube chamber and the lower sealing interface of the inner tube chamber.

In various embodiments, determining, by the controller, the desired distance between the upper sealing interface of the inner tube chamber and the lower sealing interface of the inner tube chamber based on the weight signal may comprise comparing, by the controller, the weight signal to a threshold weight. The controller may be configured to use a first distance for the desired distance if the weight signal is less than or equal to the threshold weight. The controller may be configured to use a second distance for the desired distance if the weight signal is greater than the threshold weight, the second distance being less than the first distance.

In various embodiments, the weight signal may be sent from a weight sensor. In various embodiments, the actuator may be configured to translate a propellant cartridge within inner tube chamber of the variable volume inner tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1A:
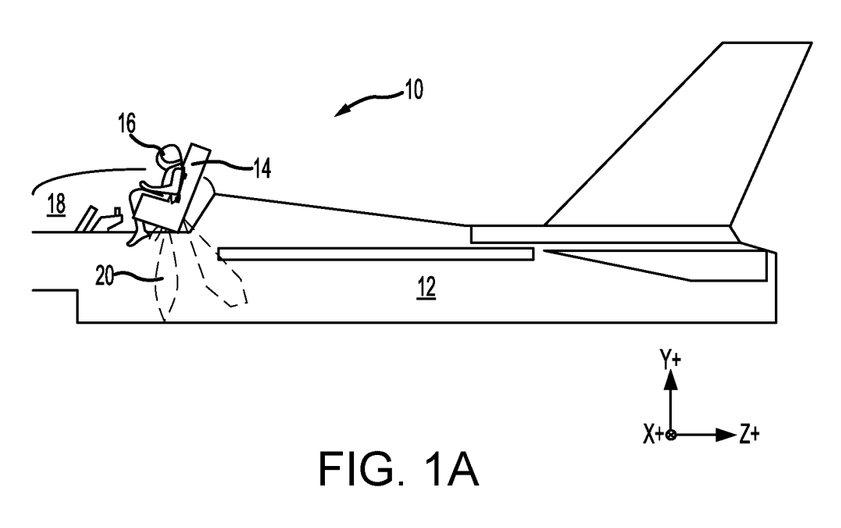
FIG. 1A illustrates an ejection seat being expelled from an aircraft, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of the ejection seat 14 from a cockpit 18 of the aircraft 12. Ejection seat 14 may be urged from cockpit 18 by a propellant 20.

Figure 1B:
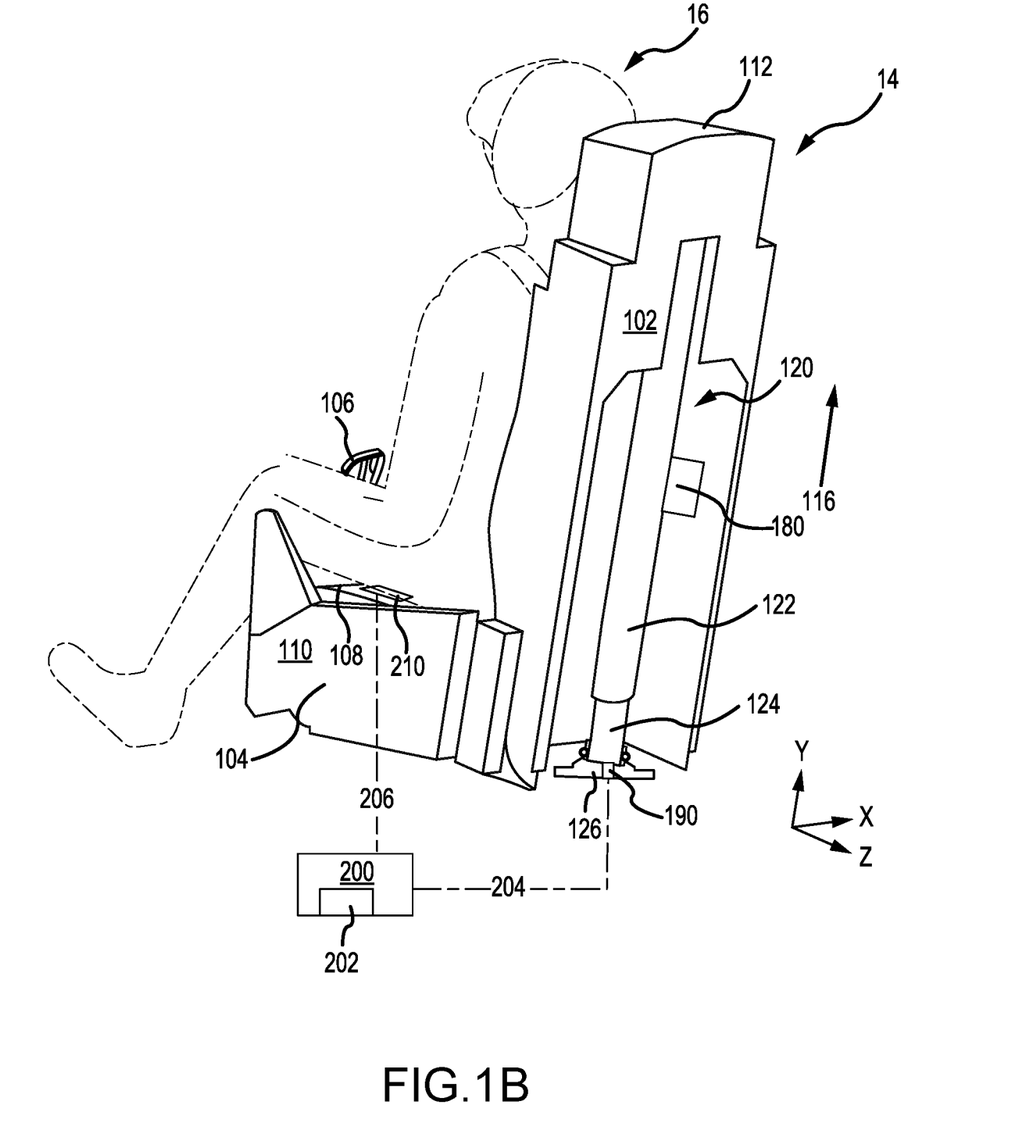
FIG. 1B illustrates an ejection seat having a high energy catapult assembly, in accordance with various embodiments.

With additional reference to FIG. 1B, ejection seat 14 is illustrated prior to deployment of the ejection system 10. In accordance with various embodiments, ejection seat 14 includes a seat back 102 and a seat bucket 104. In various embodiments, an ejection handle 106 may be located proximate a front 108 of seat bucket 104. Front 108 of seat bucket 104 is generally opposite, or distal, of seat back 102. While FIG. 1B shows ejection handle 106 located at the front 108 of seat bucket 104, it is further contemplated and understood that ejection handle 106 may be located anywhere that is accessible to the occupant 16 of ejection seat 14. For example, ejection handle 106 may be located on a side 110 of seat bucket 104 or at a headrest 112 of seat back 102.

Ejection seat 14 includes a high energy catapult assembly 120. High energy catapult assembly 120 is configured to generate the propellant 20, with momentary reference to FIG. 1A, that expels ejection seat 14 from cockpit 18. An outer tube 122 of high energy catapult assembly 120 is attached to ejection seat 14. For example, in various embodiments, outer tube 122 may be coupled to seat back 102. An inner tube 124 of high energy catapult assembly 120 is coupled to a base structure 126. Base structure 126 is a stationary structure within aircraft 12. In this regard, during deployment of ejection seat 14, base structure 126 and inner tube 124 remain stationary, while outer tube 122 and ejection seat 14, which is attached to outer tube 122, translate relative to inner tube 124 and in the direction of arrow 116. In various embodiments, actuation of ejection handle 106 causes high energy catapult assembly 120 to activate (i.e., fire).

Figure 2A:
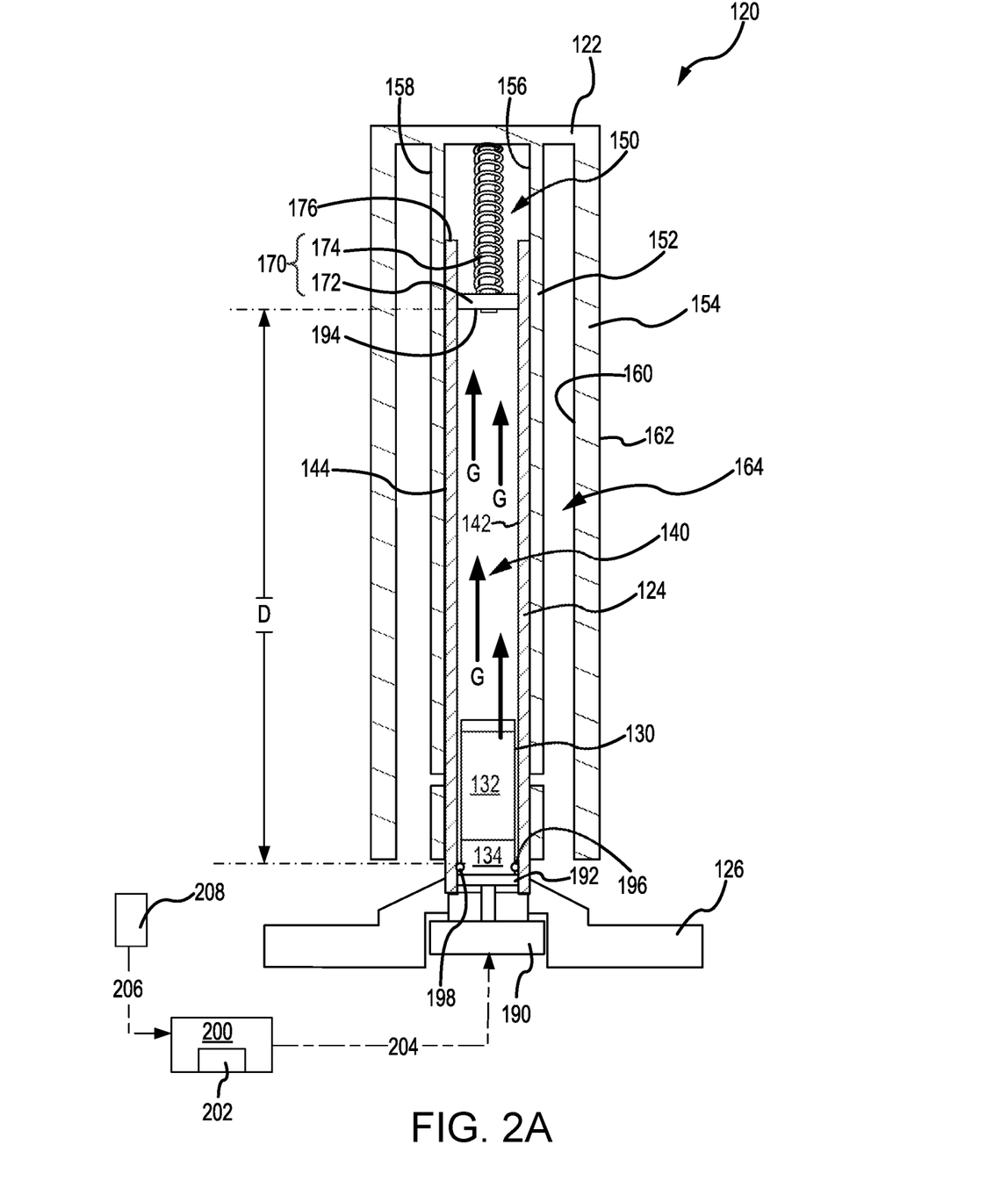
FIG. 2A illustrates a high energy catapult assembly having a variable volume inner tube in a locked state and at a first open volume, in accordance with various embodiments.

With reference to FIG. 2A, details of high energy catapult assembly 120 are illustrated. In accordance with various embodiments, high energy catapult assembly 120 includes a propellant cartridge 130. Propellant cartridge 130 includes a propellant 132 and an ignitor 134 for igniting propellant 132. In accordance with various embodiments, ignitor 134 may fire (i.e., ignite) propellant 132 in response to actuation of ejection handle 106, with momentary reference to FIG. 1B. Propellant 132 may be housed within propellant cartridge 130. In various embodiments, propellant 132 is a solid propellant, also referred to as a propellant grain.

Propellant cartridge 130 is located in an inner tube chamber 140 of inner tube 124. Inner tube chamber 140 is defined by an interior surface 142 of inner tube 124. Interior surface 142 is opposite, and oriented away from, an exterior surface 144 of inner tube 124. Inner tube 124 is located in a primary outer tube chamber 150 of outer tube 122. Primary outer tube chamber 150 is defined by an interior wall 152 of outer tube 122. In accordance with various embodiments, outer tube 122 includes interior wall 152 and an exterior wall 154. Interior wall 152 and exterior wall 154 may each be generally annularly shaped walls with exterior wall 154 being located around, and/or radially outward from, interior wall 152. Stated differently, each of interior wall 152 and exterior wall 154 may be generally cylindrical with exterior wall 154 having a larger diameter than interior wall 152.

An inner surface 156 of interior wall 152 is oriented toward inner tube 124. Inner surface 156 defines, at least partially, the primary outer tube chamber 150. Interior wall 152 further includes an outer surface 158 opposite inner surface 156. Outer surface 158 is oriented away from inner surface 156 and inner tube 124 and toward an inner surface 160 of exterior wall 154. Exterior wall 154 further includes an outer surface 162 opposite inner surface 160. Outer surface 162 is oriented away from inner surface 160 and interior wall 152. In accordance with various embodiments, outer surface 158 of interior wall 152 and inner surface 160 of exterior wall 154 define, at least partially, a secondary outer tube chamber 164. Secondary outer tube chamber 164 is a generally annularly shaped chamber located between, and/or defined by, interior wall 152 and exterior wall 154 of outer tube 122.

Upon ignition—e.g., by ignitor 134—propellant 132 combusts, thereby rapidly generating combustion gas G within inner tube chamber 140. In accordance with various embodiments, a lock assembly 170 is located between inner tube chamber 140 and primary outer tube chamber 150. In various embodiments, lock assembly 170 may include a sealing member 172 and a biasing member 174. Biasing member 174 is configured to apply a biasing force against sealing member 172. Biasing member 174 may bias sealing member 172 toward base structure 126 and/or away from an upper edge 176 of inner tube 124.

FIG. 2A illustrates lock assembly 170 in a locked (or "sealed") state. In the locked state, lock assembly 170 forms a fluid seal between inner tube chamber 140 and primary outer tube chamber 150. Stated differently, when lock assembly 170 is in the locked state, the combustion gases G produced by propellant 132 may be prevented from exiting inner tube chamber 140. As the volume of combustion gas G located in inner tube chamber 140 increases, the pressure within inner tube chamber 140 and applied to sealing member 172 increases. In accordance with various embodiments, lock assembly 170 is configured to translate to an unlocked (or "unsealed") state, in response to the pressure within inner tube chamber 140 exceeding a threshold pressure.

Figure 2B:
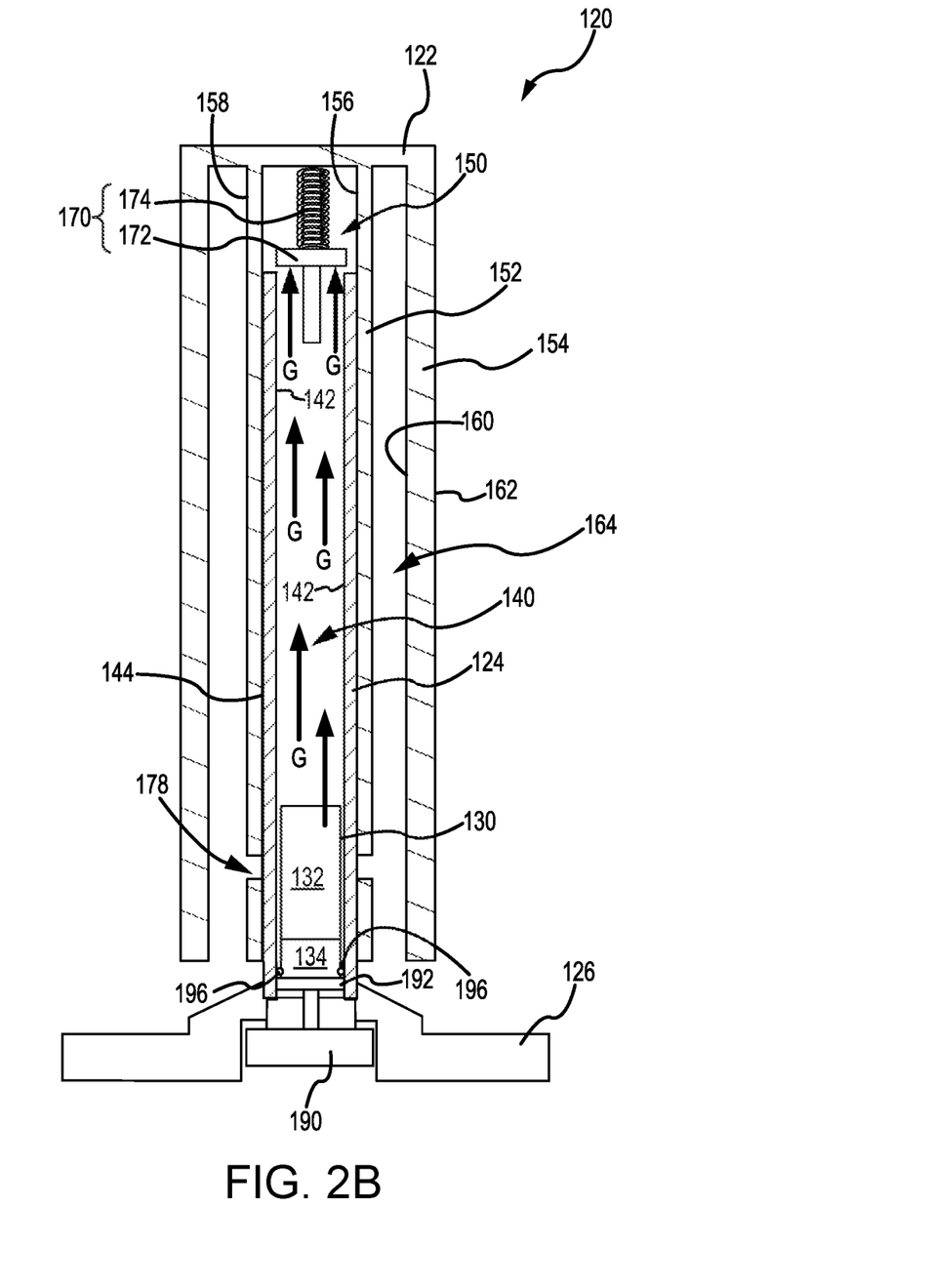
FIGS. 2B, 2C, and 2D illustrate deployment of the high energy catapult assembly of FIG. 2A, in accordance with various embodiments.

With reference to FIG. 2B, lock assembly 170 is illustrated in the unlocked state. In response to the pressure within inner tube chamber 140 exceeding the biasing force applied by biasing member 174, sealing member 172 translates away from base structure 126 and compresses biasing member 174. Sealing member 172 translates toward biasing member 174, at least, until sealing member 172 is located outside inner tube chamber 140. In this regard, in the unlocked state, sealing member 172 is located outside inner tube chamber 140. Stated differently, in the unlocked state, the fluid seal formed between inner tube chamber 140 and primary outer tube chamber 150 is removed, thereby allowing the combustion gases G to flow from inner tube chamber 140 into primary outer tube chamber 150.

Figure 2C:
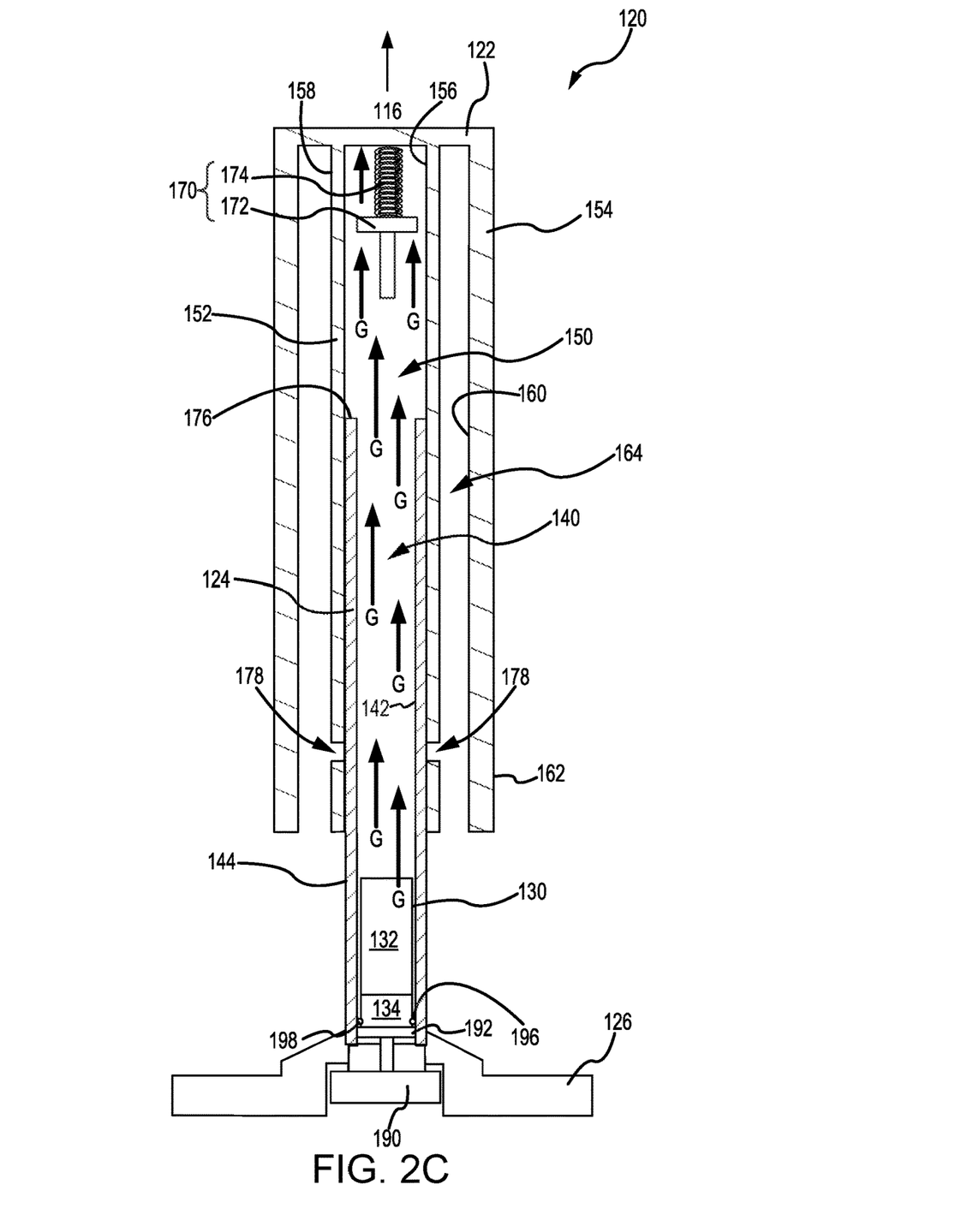

With reference to FIG. 2C, as the combustion gases G flow into primary outer tube chamber 150, the pressure within primary outer tube chamber 150 begins increasing. The increased pressure in primary outer tube chamber 150 causes outer tube 122 to translate (i.e., telescope) relative to inner tube 124 and away from base structure 126. Stated differently, the flow of combustion gases G into primary outer tube chamber 150 generates thrust for launching outer tube 122 and ejection seat 14, with momentary reference to FIG. 1B, away from base structure 126 (i.e., in the direction of arrow 116).

Figure 2D:
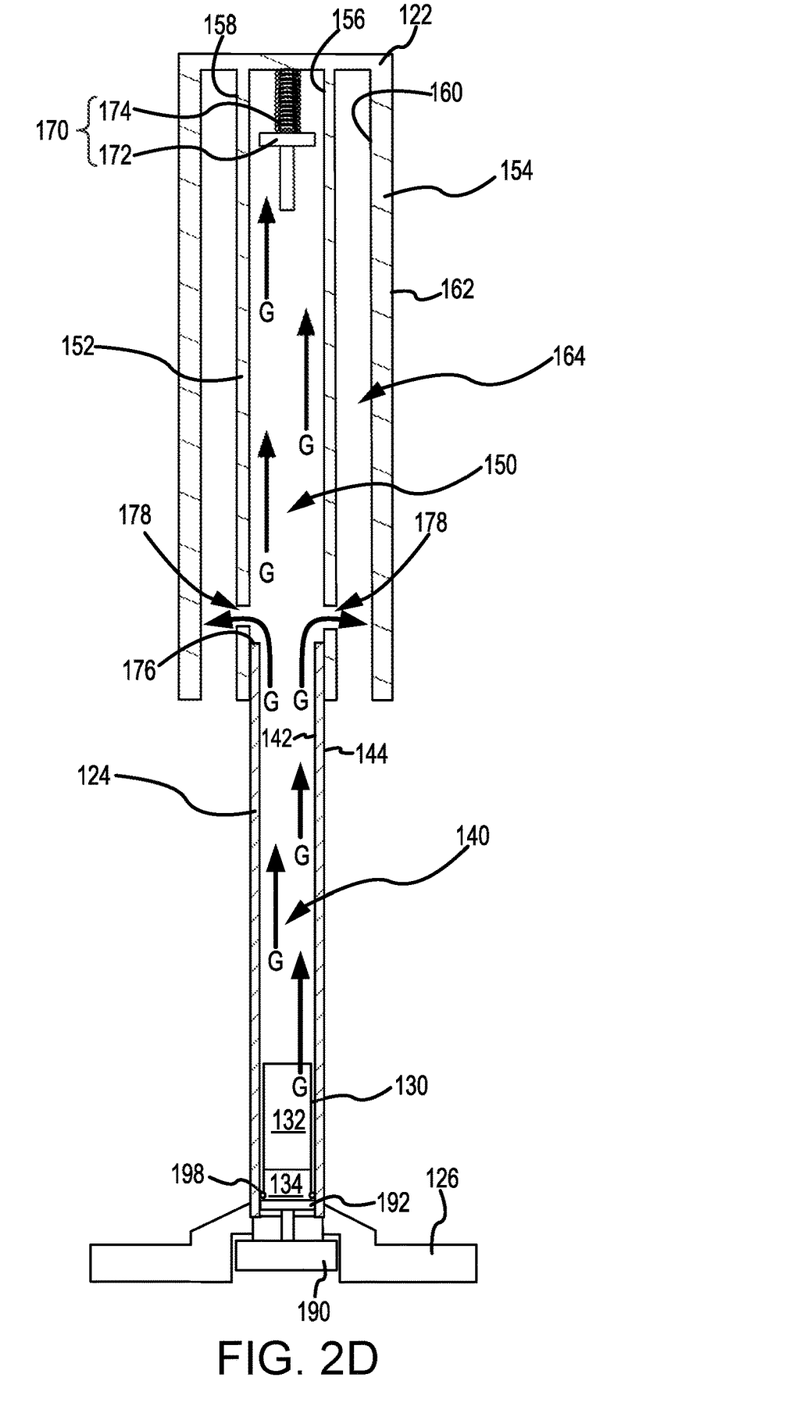

With reference to FIG. 2D, in accordance with various embodiments, interior wall 152 of outer tube 122 may include one or more orifice(s) 178. Stated differently, interior wall 152 may define one or more orifice(s) 178. Orifice(s) 178 extend from inner surface 156 of interior wall 152 to outer surface 158 of interior wall 152. Orifice(s) 178 are configured to fluidly connect primary outer tube chamber 150 and secondary outer tube chamber 164. In accordance with various embodiments, combustion gases G may cause outer tube 122 to translate away from base structure 126, until orifice(s) 178 translate past upper edge 176 of inner tube 124. Once orifice(s) 178 clear upper edge 176, combustion gases G may flow through orifice(s) 178 and into secondary outer tube chamber 164, thereby relieving the pressure, and/or stopping the increase of pressure, within primary outer tube chamber 150. Prior to orifice(s) 178 clearing upper edge 176, inner tube 124 blocks, or generally prevents, combustions gases G from flowing through orifice(s) 178.

With combined reference to FIG. 1B and FIG. 2D, in various embodiments, high energy catapult assembly 120 may further include a high energy mortar 180 (also referred to as a rocket mortar). Rocket mortar 180 is configured to fire after outer tube 122 has begun translating away from base structure 126. For example, in various embodiments, rocket mortar 180 may be configured to fire in response to orifice(s) 178 translating past upper edge 176 of inner tube 124. In this regard, rocket mortar 180 continues providing thrust to expel ejection seat 14 from cockpit 18 and away from aircraft 12, after the combustion gases G have begun flowing into secondary outer tube chamber 164.

Returning to FIG. 2A, in accordance with various embodiments, high energy catapult assembly 120 includes an actuator 190. Actuator 190 is configured to change an open volume of inner tube chamber 140. In various embodiments, actuator 190 changes the open volume of inner tube chamber 140 by translating propellant cartridge 130 within inner tube chamber 140 and relative to base structure 126. For example, propellant cartridge 130 may be coupled to a piston 192 of actuator 190. Actuation of piston 192 translates propellant cartridge 130 within inner tube chamber 140. As used herein, the "open volume" refers to the volume available for combustion gases G within inner tube chamber 140 with lock assembly 170 in the locked state and prior to igniting propellant 132. In various embodiments, the open volume may be defined by an upper (or first) sealing interface 194 of inner tube chamber 140, a lower (or second) sealing interface 196 of inner tube chamber 140, and the portion of interior surface 142 that extends from upper sealing interface 194 to lower sealing interface 196. Upper sealing interface 194 is located closer to upper edge 176 of inner tube 124 as compared to lower sealing interface 196, and lower sealing interface 196 is located closer to base structure 126 as compared to upper sealing interface 194.

In various embodiments, upper sealing interface 194 is formed by sealing member 172. Upper sealing interface 194 is formed when lock assembly 170 in the locked state. Upper sealing interface 194 is removed in response to lock assembly 170 translating to the unlocked state. In this regard, the upper sealing interface 194 is removed in response to the pressure within the open volume of inner tube chamber 140 exceeding a threshold pressure. Stated differently, lock assembly 170 is configured to maintain the upper sealing interface 194, when the pressure within the open volume of inner tube chamber 140 is less than the threshold pressure. Removing upper sealing interface 194 allows the combustion gases G in the open volume of inner tube chamber 140 to flow into primary outer tube chamber 150 (FIGS. 2B and 2C), thereby generating thrust to expel ejection seat 14 from cockpit 18.

In various embodiments, lower sealing interface 196 may be formed by a seal 198. Seal 198 is configured to translate with piston 192 and propellant cartridge 130. Seal 198 forms a fluid tight seal with interior surface 142 of inner tube 124. The fluid tight seal prevents the flow of combustion gases G past seal 198. In various embodiments, seal 198 may be located between propellant cartridge 130 and interior surface 142 of inner tube 124. While seal 198 is illustrated as located between propellant cartridge 130 and interior surface 142 of inner tube 124, it is contemplated and understood that seal 198 may be located anywhere that allows seal 198 to translate with propellant cartridge 130, while maintaining the lower sealing interface 196. For example, in various embodiments, seal 198 may be located between piston 192 of actuator 190 and interior surface 142.

In accordance with various embodiments, actuator 190 varies the surface area (and volume) of the open volume in inner tube chamber 140 by changing a distance D between the upper sealing interface 194 of inner tube chamber 140 and the lower sealing interface 196 of inner tube chamber 140. In this regard, inner tube 124 of high energy catapult assembly 120 is a variable volume inner tube. As used herein, "variable volume" means the open volume of inner tube chamber 140 of inner tube 124 may be changed/adjusted prior to deployment of the ejection seat. For example, and with additional reference to FIG. 3, actuator 190 decreases distance D and the open volume in inner tube chamber 140 by translating the lower sealing interface 196 toward the upper sealing interface 194. In this regard, the distance D in FIG. 2A is greater than the distance D in FIG. 3; thus, the open volume of inner tube chamber 140 in FIG. 2A is greater than the open volume of inner tube chamber 140 in FIG. 3. Stated differently, in FIG. 2A, inner tube chamber 140 has a first open volume, and in FIG. 3 inner tube chamber 140 has a second open volume, which is less than the first open volume. Increasing the open volume of inner tube chamber 140 decreases the acceleration forces experienced by the occupant 16 of ejection seat 14. Conversely, decreasing the open volume of inner tube chamber 140 increases the acceleration forces.

Figure 3:
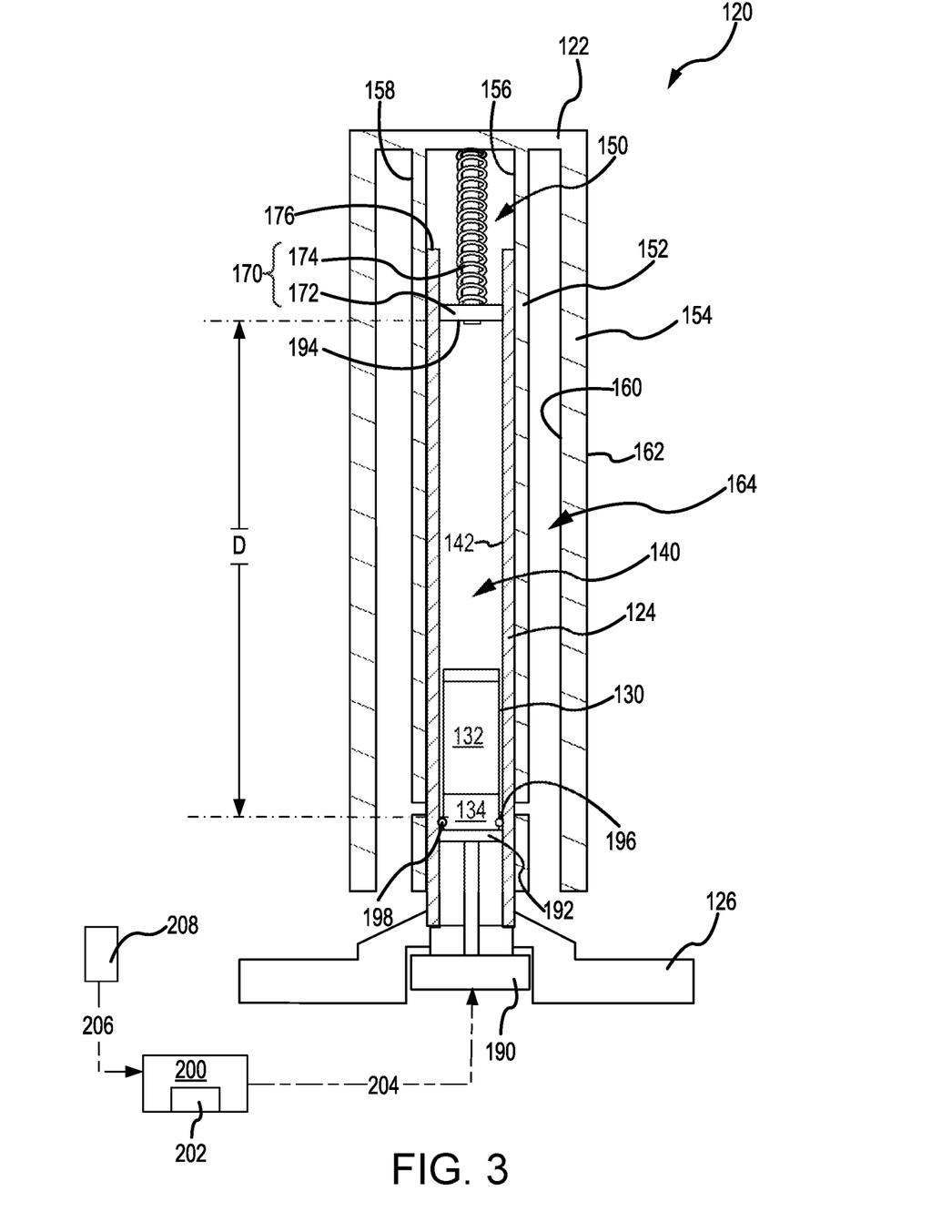
FIG. 3 illustrates the high energy catapult assembly of FIG. 2A with the variable volume inner tube in the locked state and at a second open volume, in accordance with various embodiments.

With continued reference to FIG. 2A and FIG. 3, in accordance with various embodiments, high energy catapult assembly 120 may further comprise a controller 200 for controlling the actuation of actuator 190. Controller 200 is in communication with (i.e., operably coupled to) actuator 190. In various embodiments, controller 200 may send actuation commands 204 to actuator 190. Piston 192 may actuate in response to the actuation commands 204 from controller 200.

Controller 200 may include one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof. A tangible, non-transitory computer-readable storage medium 202 may be in communication with controller 200. Storage medium 202 may comprise any tangible, non-transitory computer-readable storage medium known in the art. The storage medium 202 has instructions stored thereon that, in response to execution by controller 200, cause controller 200 to perform operations related to determining a desired open volume for inner tube chamber 140 based on the weight of seat occupant 16. In this regard, controller 200 is configured to control the actuation and the position of piston 192, and thereby control distance D.

In accordance with various embodiments, an occupant weight input 208 is operably coupled to controller 200. Controller 200 may receive weight signals 206 from occupant weight input 208. Occupant weight input 208 may be a knob, switch, keyboard, touchpad, voice input, a radio frequency identification (RFID) or other scannable tag worn by occupant 16, or any system capable of allowing occupant 16 to input his/her weight. In various embodiments, occupant weight input 208 may be configured to allow the occupant 16 to input an exact weight. In various embodiments, occupant weight input 208 may be configured to allow the occupant 16 to select a weight range (e.g., light weight, medium weight, heavy weight). Weight signal 206 corresponds to a weight entered and/or selected by the occupant 16 using occupant weight input 208 (controller 200 and occupant weight input 208 have been removed from FIGS. 2B, 2C, and 2D to more clearly illustrate other features of high energy catapult assembly 120).

In accordance with various embodiments, controller 200 may determine at what distance D the lower sealing interface 196 should be located based on weight signal 206. For example, in various embodiments, occupant weight input 208 may be configured to allow the occupant 16 to select either light weight, medium weight, or heavy weight and controller 200 may be determine which of light weight, medium weight, or heavy weight was selected by occupant 16 based on the weight signal 206. In response to determining weight signal 206 corresponds to a light weight selection by occupant 16, controller 200 may send an actuation command 204 configured to set distance D at a first distance. In response to determining weight signal 206 corresponds to a medium weight selection by occupant 16, controller 200 may send an actuation command 204 configured to set distance D at a second distance, the second distance being less than the first distance. In response to determining weight signal 206 corresponds to a heavy weight selection by occupant 16, controller 200 may send an actuation command 204 configured to set distance D at a third distance, the third distance being less than the second distance and the first distance. While three weight selections and three distances D are described, it is contemplated and understood that occupant weight input 208 may allow occupant 16 to select from any number of weight selection options, with controller 200 being configured to command actuator 190 to set distance D at any number of distances.

In various embodiments, occupant weight input 208 may be configured to allow the occupant 16 to input or select an exact weight (e.g., in increments of 1 pound (lb.), or in increments of 1 kilogram (kg)). Weight signal 206 may correspond to the weight input by occupant 16. Controller 200 may compare weight signal 206 to one or more weight thresholds to determine the desired distance D. For example, in response to determining weight signal 206 is less than or equal to a first weight threshold, controller 200 may send an actuation command 204 configured to set distance D at a first distance. In response to determining weight signal 206 is greater than the first weight threshold and less than or equal to a second weight threshold, controller 200 may send an actuation command 204 configured to set distance D at a second distance, the second distance being less than the first distance. In response to determining weight signal 206 is greater than the second weight threshold, controller 200 may send an actuation command 204 configured to set distance D at a third distance, the third distance being less than the second distance and the first distance. While two weight thresholds and three distances D are described, it is contemplated and understood that controller 200 may compare weight signal 206 to any number of weight thresholds selections, with controller 200 being configured to command actuator 190 to set distance D at any number of distances.

In various embodiments, occupant weight input 208 may be configured to measure the real-time weight of occupant 16. For example, in various embodiments, occupant weight input 208 may comprise a weight sensor 210, with momentary reference to FIG. 1B, located in seat bucket 104. Weight sensor 210 may measure the weight of occupant 16. Weight signal 206 may correspond to the weight measured by weight sensor 210. As described above, controller 200 may compare the weight signal 206 received from weight sensor 210 to one or more weight thresholds to determine the desired distance D.

Varying the open volume of inner tube chamber 140 based on the seat occupant's weight tends to increase occupant safety. A larger open volume (assuming a constant amount of propellant 132 burned) tends to create less pressure resulting in lower acceleration forces for lighter occupants. A smaller open volume (assuming a constant amount of propellant 132 burned) tends to create more pressure resulting in larger acceleration force to compensate for heavier occupants.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 115(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A high energy catapult assembly, comprising:
   an outer tube;
   an inner tube located within the outer tube, wherein the outer tube is configured to telescope relative to the inner tube;
   a propellant cartridge located in an inner tube chamber of the inner tube; and
   an actuator configured to change an open volume of the inner tube chamber of the inner tube.

2. The high energy catapult assembly of claim 1, wherein the open volume is defined, at least partially, by an upper sealing interface of the inner tube chamber, a lower sealing interface of the inner tube chamber, and an interior surface of the inner tube, and wherein the actuator is configured to change a distance between the upper sealing interface and the lower sealing interface.

3. The high energy catapult assembly of claim 2, wherein a piston of the actuator is coupled to the propellant cartridge, and wherein actuation of the piston translates the propellant cartridge within the inner tube chamber.

4. The high energy catapult assembly of claim 3, further comprising a seal configured to translate with the piston, wherein the seal forms the lower sealing interface.

5. The high energy catapult assembly of claim 4, wherein the seal is located between the propellant cartridge and the interior surface of the inner tube.

6. The high energy catapult assembly of claim 2, further comprising:
   a controller configured to send actuation commands to the actuator; and
   an occupant weight input operably coupled to the controller.

7. The high energy catapult assembly of claim 6, wherein the controller is configured to command the actuator to set the distance between the upper sealing interface and the lower sealing interface to a first distance in response to determining a weight signal received from the occupant weight input is less than or equal to a threshold weight, and wherein the controller is configured to command the actuator to set the distance between the upper sealing interface and the lower sealing interface to a second distance in response to determining the weight signal received from the occupant weight input greater than the threshold weight, the second distance being less than the first distance.

8. The high energy catapult assembly of claim 7, wherein the occupant weight input comprises a weight sensor.

9. An ejection seat, comprising
   a seat back; and
   a high energy catapult assembly configured to expel the ejection seat from an aircraft, the high energy catapult assembly comprising:

an outer tube coupled to the seat back;

an inner tube located within the outer tube, wherein the outer tube is configured to telescope relative to the inner tube;

a propellant cartridge located in an inner tube chamber of the inner tube; and an actuator configured to change an open volume of the inner tube chamber.

10. The ejection seat of claim 9, wherein the open volume is defined, at least partially, by an upper sealing interface of the inner tube chamber, a lower sealing interface of the inner tube chamber, and an interior surface of the inner tube, and wherein the actuator is configured to change a distance between the upper sealing interface and the lower sealing interface.

11. The ejection seat of claim 10, further comprising a base structure coupled to the inner tube, wherein the base structure is configured to be stationary during expulsion of the ejection seat.

12. The ejection seat of claim 10, wherein a piston of the actuator is coupled to the propellant cartridge, and wherein actuation of the piston translates the propellant cartridge within the inner tube chamber.

13. The ejection seat of claim 12, wherein the high energy catapult assembly further comprises a seal configured to translate with the piston, and wherein the seal forms the lower sealing interface.

14. The ejection seat of claim 10, further comprising:

a controller configured to send actuation commands to the actuator; and an occupant weight input operably coupled to the controller.

15. The ejection seat of claim 14, wherein the controller is configured to command the actuator to set the distance between the upper sealing interface and the lower sealing interface to a first distance in response to determining a weight signal received from the occupant weight input is less than or equal to a threshold weight, and wherein the controller is configured to command the actuator to set the distance between the upper sealing interface and the lower sealing interface to a second distance in response to determining the weight signal received from the occupant weight input greater than the threshold weight, the second distance being less than the first distance.

16. The ejection seat of claim 15, further comprising a seat bucket, wherein the occupant weight input comprises a weight sensor located in the seat bucket.

17. An article of manufacture including a tangible, non-transitory computer-readable storage medium having instructions stored thereon for determining an open volume of a variable volume inner tube of a high energy catapult assembly and that, in response to execution by a controller, cause the controller to perform operations comprising:

receiving, by the controller, a weight signal;

determining, by the controller, a desired distance between an upper sealing interface of an inner tube chamber of the variable volume inner tube and a lower sealing interface of the inner tube chamber of the variable volume inner tube based on the weight signal; and sending, by the controller, an actuation command corresponding the desired distance to an actuator, the actuator being configured to change a distance between the upper sealing interface of the inner tube chamber and the lower sealing interface of the inner tube chamber.

18. The article of claim 17, wherein determining, by the controller, the desired distance between the upper sealing interface of the inner tube chamber and the lower sealing interface of the inner tube chamber based on the weight signal comprises:

comparing, by the controller, the weight signal to a threshold weight, wherein the controller is configured to use a first distance for the desired distance if the weight signal is less than or equal to the threshold weight, and wherein the controller is configured to use a second distance for the desired distance if the weight signal is greater than the threshold weight, the second distance being less than the first distance.

19. The article of claim 17, wherein the weight signal is sent from a weight sensor.

20. The article of claim 17, wherein the actuator is configured to translate a propellant cartridge within the inner tube chamber of the variable volume inner tube.

* * * * *

UNITED STATES PATENT AND TRADEMARK OFFICE
CERTIFICATE OF CORRECTION

| | |
|---|---|
| PATENT NO. | : 11,479,362 B1 |
| APPLICATION NO. | : 17/231797 |
| DATED | : October 25, 2022 |
| INVENTOR(S) | : Matthew D. Salois et al. |

It is certified that error appears in the above-identified patent and that said Letters Patent is hereby corrected as shown below:

On the Title Page

Item (65) please insert --Prior Publication Data US 2022/0332428 A1 Oct. 20, 2022--

Signed and Sealed this
Fourteenth Day of March, 2023

Katherine Kelly Vidal
*Director of the United States Patent and Trademark Office*